Dec. 2, 1924.  
H. H. LIPSEY  
PISTON PACKING RING  
Filed Oct. 28, 1921

1,517,561

Inventor:
Henry H. Lipsey

Patented Dec. 2, 1924.

1,517,561

UNITED STATES PATENT OFFICE.

HENRY H. LIPSEY, OF LOS ANGELES, CALIFORNIA.

PISTON PACKING RING.

Application filed October 28, 1921. Serial No. 511,150.

*To all whom it may concern:*

Be it known that I, HENRY H. LIPSEY, a citizen of the United States, residing in the city of Los Angeles, State of California, have invented a certain new and useful Improvement in Piston Packing Rings, of which the following is a specification.

This invention relates to improvements in the packing rings, and particularly to improvements in piston packing rings adapted for the use with pistons, and has for one of its objects to provide an efficient packing ring which may be applied readily whenever required to form a leak-proof joint. It is a plain two piece piston packing ring consisting of outer and inner ring, the outer ring having the advantage of any single one piece ring and the inner ring making it leak proof. The inner ring inserted into an acute angle groove, making it self-contracting and expanding with little friction and does not contain any internal coil springs of fiber packing of any kind.

Another object is, to provide a packing ring which is so constructed that the parts of same are held together to prevent the loosening of one part from the other when the packing ring is not in use; and a further object is to provide a compact packing ring, the part of which will not separate when the same is in use and the inside ring will not turn out of its place so as to allow a joint to joint opening and thus reduce its efficiency as a leak-proof packing ring.

Piston rings must be split so they can be sprung over the piston and placed in the groove therein. This leaves an open space or split which is a source of leakage. Various means have been proposed to eliminate this leakage but without success, on account of having frail and weak interlocking parts facing the cylinder wall. Average rings in use are from one-eighth to three-sixteenths of an inch in width facing the cylinder wall and most piston grooves are milled for above sizes of piston rings. In piston rings having tongue and groove, interlocking devices or pins reducing expansion and contraction and uniform pressure against the cylinder wall, causing frail and weak parts to break and cut the wall of the cylinder owing to the fact that the chief material used for piston rings is cast iron.

Another object, is to provide a piston packing ring with one width facing the cylinder wall without a complicated joint, assuring a strong, secure and lasting wearing part. And having an acute groove on the inside of the outer ring milled about 270 degrees along the circumference in lieu thereof of the outer ring, with a channel part on the top guarding the inner ring from working up and keeping the inner ring flush with the bottom of the outer ring causing a secure and tight seal at the joint clear down to the bottom of the outer ring. Having no delicate or frail parts to break and get out and cut the wall of the cylinder, thereby making it a positive and true leak-proof piston packing ring.

The inner ring is made to match the acute angle in the inside of the outer ring and has a feather edge at the inside bottom of the outer ring forming a uniform joint with the bottom base of the piston groove by having the bottom of the outer ring in full strength, all in one piece, thereby guarding against any leakage or breakage. Other objects will appear hereinafter.

The invention is illustrated in the accompanying drawings in which:

Figure 1 showing the external side surface of the outer ring, also showing the joint fully expanded and ready to mount over the piston. Also showing the inner ring in its place.

Fig. 2 is a view of the inner surface of the unmilled portion of the outer ring which prevents the inner ring from turning, also makes the outer ring stronger due to it being about opposite the step joint.

Fig. 3 showing the inner ring in its place of the obtuse angle in the outer ring. Also showing the one end of the inner ring with space to adjust itself in the milled portion of the acute angle.

Figure 1:
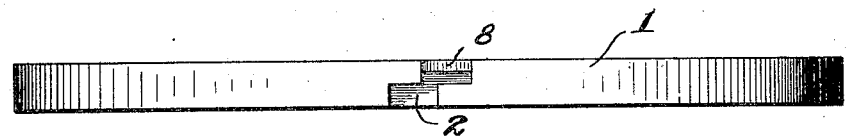

Referring to the accompanying drawing, 1 designates the outer surface of the outer ring bearing against the cylinder wall in one solid piece and width without any joints. 8 showing the outer ring expanded to its capacity to mount over the piston. Also showing the amount of the tension when the ring is not in use. When the ring is set in its place in its piston groove and pressed into the groove in order to enter the piston into the cylinder the right and left steps, shown at 8 and 2 will join together with a slight opening of approximately one sixty-fourth of an inch, allowing for the expansion of the heat of the engine; avoiding high friction which causes damage to the ring and the wall of the cylinder. At 2, Fig. 1, and 10 in Fig. 5, I also claim a strong point in my invention which shows the outside surface of the inner ring sealing the open joint clear down to the bottom of the outer ring, making it entirely leak-proof to the bottom of the piston groove.

Figure 5:
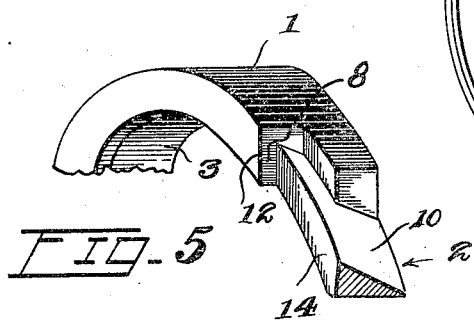
Fig. 5 shows the inner ring in its place and sealing the joint of the outer ring halfway. Also showing how the channel of the outer ring holds the inner ring in its place and the feather edge of the inner ring sealing the joint clear down to the bottom of the outer ring.

2 in Fig. 5 shows feather edge of the obtuse inner ring sealing down to the bottom groove of the piston, making a complete leak-proof joint.

Another advantage it gives to the bottom side of the outer ring a solid section where it joins with the bottom of the piston ring groove which is a very important feature in a leak-proof ring which guards against any slight leakage of any compression, and by joining the feather edge of the inner ring to the bottom on the inside of the outer ring as shown in Figs. 5, 2—10 and 14, the obtuse angle of the inner ring making a durable, uniform and substantial fit, guarding against any possible chance of any oil leakage or forcing down into the crank case of any gasoline.

Figure 2:
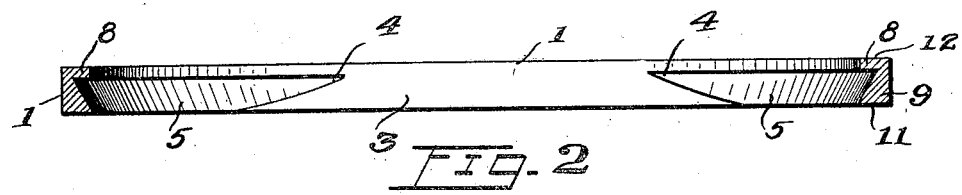

Fig. 2 designates the acute angle grooves, 5 and 5, which allows the inner ring to travel according to the expansion and the contraction which the walls of the cylinder require. 1 and 1 shows the width of the outer ring in one solid section which bears against the cylinder wall. 4 and 4 showing the ends of the milled portion of the "acute angle grooved portion" of the inner surface of the external ring. 3 showing the inside surface of the outer ring of the unmilled portion which prevents the inner ring from turning. Also makes the outer ring stronger due to it being about opposite the step joint. Also insuring an equal tension all around.

8 and 8 shows the channel on top of the outer ring. Referring to the Fig. 5, 8 and 2 showing how the inner obtuse angle ring rests in place against the channel base of the top of the outer ring preventing the inner ring from moving out of its place. The feather edge 2 sealing the outer ring joint clear down to the bottom of the outer ring.

Fig. 2 shows the view of the acute angle 9 on the inside of the outer ring without any interlocking parts or grooves to interfere with the expansion and contraction of the piston ring, allowing a free movement and assuring a uniform fit against the wall of the cylinder. 11 shows the thickness of the bottom of the outer ring in one solid piece, making a strong and fortified seat against the bottom of the piston ring groove which eliminates any possible chance of leakage. The top side of the outer ring 12 shows also to be one solid thickness assuring strength and prevention against any possible leakage.

Figure 3:
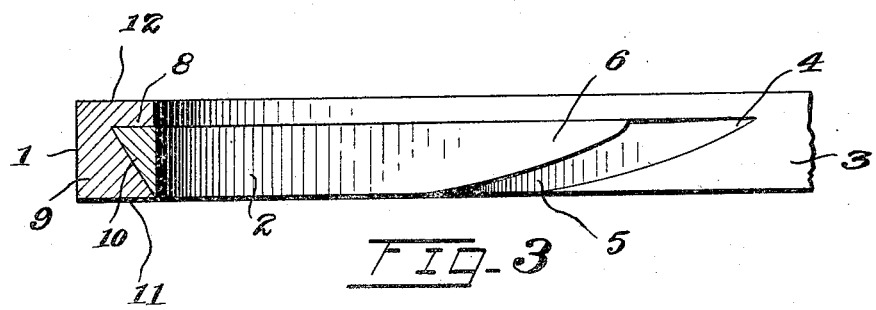
Figure 4:
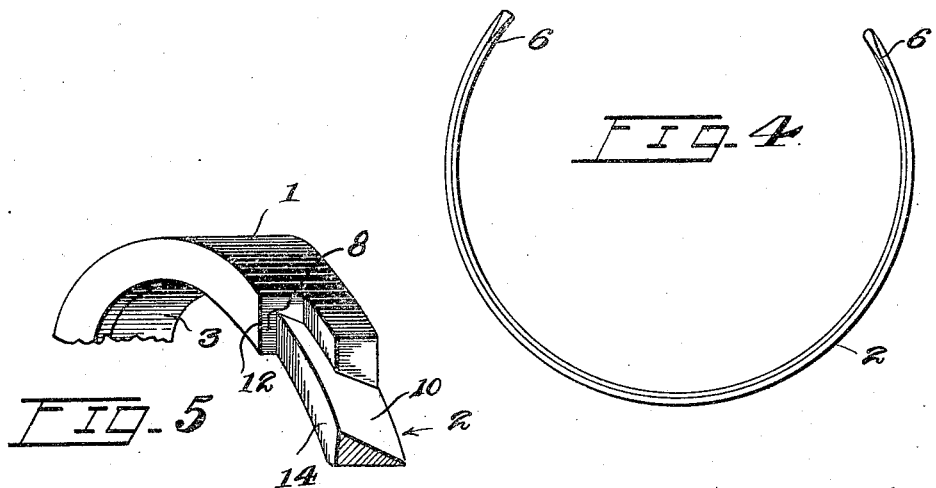
Fig. 4 is a view of the inner ring showing the ends of the milled portion of the top edge and the bottom edge.

Fig. 3, referring to 3 showing part of the unmilled portion opposite the step cut joint of the outer ring. 5 showing part of the milled portion running to the taper end 4 of the milled portion to allow the inner ring end 6 compensating as showing in Figs. 4, 6 and 6, the ends of the inner ring 2 shows part of the inner ring surface which joins onto the inside surface of the outer ring. 9 and 10 shows the inner ring in its place of the obtuse angle in the inside of the outer ring extending to the inside bottom of the outer ring and at the same time forming an even surface in line with the inside of the outer ring.

Fig. 4 shows the drawing of the inner ring with the ends 6 and 6 showing the top view joining the channel 8 and 8 in Fig. 2. Also 2 of Fig. 4 corresponding with 2 in Fig. 5 showing the obtuse angle between 14 and 2, forming a feather edge. Also showing the cross section of the obtuse angle of the inner ring.

Fig. 5 showing 1 drawing of the one end of step joint of the outer ring. Also bottom edge 2 of the obtuse angle of the inner ring. 10 showing the broad face of the inner ring joining the inside obtuse angle of the outer ring and forming a leak-proof joint at the ends of the outer ring, or the gap of the ends of the outer ring. 8 shows the channel on the top of the inside of the outer ring joining with the top surface of the inside ring 14. The same channel holding the inner ring from working itself up, and keeping the inner ring in its place so that the inner ring edge 2 will form a leak-proof joint to the bottom of the outer ring. 3 shows the inside surfaces of the outer and the inner rings flush with each other forming a smooth inner periphery. 12 shows the top edge of the outer ring being in one solid piece.

I claim:

A resilient split piston ring comprising a member having a cylinder bearing surface and an inner annular groove, said groove having one of its walls perpendicular to the axis of the ring and another of its walls being disposed obliquely thereto, the ends of said groove being tapered and terminating at a substantial distance on each side of a point diametrically opposite the split portion of the ring; in combination with an open spring annulus matching and fitting in said groove, the ends of said spring annulus being tapered to correspond with the taper of the respective ends of the groove and the body portion diametrically opposite its opening bearing against and closing the split of the ring.

HENRY H. LIPSEY.